United States Patent [19]

Nordsiek

[11] 3,803,080

[45] Apr. 9, 1974

[54] PROCESS FOR THE DEFINED INCREASE OF THE MOLECULAR WEIGHT OF SOLID, UNSATURATED ELASTOMERS

[75] Inventor: Karl-Heinz Nordsiek, Marl, Germany

[73] Assignee: Chemische Werke Huls, AG, Marl, Germany

[22] Filed: July 5, 1972

[21] Appl. No.: 272,939

Related U.S. Application Data

[62] Division of Ser. No. 39,862, May 22, 1970, Pat. No. 3,696,087.

[52] U.S. Cl.. 260/33.6 AQ, 252/429 R, 252/429 A, 260/41.5 R, 260/80.7, 260/80.78, 260/85.1, 260/94.7 R, 260/94.7 N, 260/96 R

[51] Int. Cl..... C08d 5/02, C08c 11/18, C08c 11/22

[58] Field of Search......... 260/85.1, 94.7 R, 94.7 N, 260/96 R, 33.6 AQ, 41.5 R; 252/429 R, 429 A

[56] References Cited

UNITED STATES PATENTS 3,366,583  1/1968  Wilson............................ 252/429 R 3,450,797  6/1969  Schafer et al................... 252/429 R

FOREIGN PATENTS OR APPLICATIONS 992,210  5/1965  Great Britain

OTHER PUBLICATIONS

Engel et al. –Rubber & Plastics Age–45, 1,499–1,502 & 1,504 (1964).

Primary Examiner—Morris Liebman
Assistant Examiner—H. H. Fletcher
Attorney, Agent, or Firm—Millen, Raptes & White

[57] ABSTRACT

The molecular weight of solid hydrocarbon elastomers, e.g., polybutadienes, is increased step-wise in a defined manner by subjecting them to thermal-mechanical treatment in which the elastomer is subjected to strong shearing forces at, e.g., 80°–220° C., in the presence of a non-basic metallic compound as catalyst and a basic compound as cocatalyst.

27 Claims, No Drawings

PROCESS FOR THE DEFINED INCREASE OF THE MOLECULAR WEIGHT OF SOLID, UNSATURATED ELASTOMERS

This is a division of U.S. Pat. Ser. No. 39,862, filed May 22, 1970, now U.S. Pat. No. 3,696,087.

BACKGROUND OF THE INVENTION

This invention relates to a process for the defined increase in the molecular weight of solid polydiene elastomers, copolymers thereof with monoolefins, and blends thereof, by a catalyzed thermal-mechanical treatment in the solid phase.

In view of the wide variety of end products in the rubber industry, and the various processing methods employed to produce them, the alternatives offered by the polymer producers for varying the viscosity of the elastomer component employed in any specific operation, are insufficient to satisfy the wishes and requirements of the rubber-processing industry. Therefore, there is a need for an operating process which makes it possible to adjust, by simple means using conventional available equipment, the molecular weight or the viscosity of the selected elastomer, copolymer or blend to the optimum for the intended purpose.

Also, it is often desirable to raise to a higher level the viscosity of a mixture of elastomers which has become substantially reduced in viscosity during processing. Such a step is of great importance, for example, in obtaining optimum extrusion properties, or for improving the stability or shelf life of extruded unvulcanized elastomer mixtures.

Finally, due to a shortened mixing period, savings in production costs are achieved when using elastomers of a low viscosity during the step of incorporating fillers and/or plasticizers. However, this cost advantage can be exploited only if it is possible to thereafter substantially increase the rigidity of the mixture, as required in the subsequent production steps, by a jump-like increase in the molecular weight at one or more desired points during the manufacturing process.

Similar savings in expenses are possible for the production of elastomer-oil mixtures. However, a prerequisite of a satisfactory application and processing of such mixtures is a higher molecular weight of the elastomer contained therein. Thus, conventionally, the elastomer-oil mixture is prepared by mixing the components in the latex or solution phase, directly following the polymerization. However, this method of operation has the disadvantage that the inexpensive extender oil contained in the mixture involves the same processing and/or production costs as more expensive rubber in subsequent processing into solid rubber mixtures. As a result, there exists a need for specific measures, in order to achieve a basic technological improvement, which makes it possible to obtain rubber of the requisite higher molecular weight required in the oil extending step, starting with the usual non-extended rubber types, employing a suitable reaction subsequent to or during the incorporation of extender oils, for example in an internal mixer or on a rolling mill.

There have been a multitude of attempts to treat elastomers with various compounds in order to alter their molecular weight. These attempts, in part, served objectives different from that of the present invention. Also, they did not lead to a solution of the same problem due to the character of the compounds employed.

Thus, a process is known from German Published Pat. application DAS 1,260,794 according to which elastomers are treated with halogenides of sulfur in order to avoid the troublesome properties of the so-called "cold flow." In that process, a minor increase in the molecular weight of the elastomers is obtained after the incorporation of these compounds. The sulfur halides can be mixed with the elastomer in a masticator or on a rolling mill. However, as expressly pointed out in that reference, the metered incorporation of sulfur halides into the hydrocarbon solution of the elastomers, as they are obtained at the end of the stereospecific polymerization thereof, makes more sense technologically. Also, the handling of such reactive compounds leads to considerable corrosion troubles, especially in connection with the metallic parts of customary mixing devices.

It is also known that a jump-like increase in the molecular weight of elastomers can be achieved by treating the elastomers in solution with various catalyst systems (E.F. Engel, J. Schafer, and K.M. Kiepert, "Kautschuk und Gummi" [Caoutchouc and Rubber] 17 (1964), p. 702). Such catalyst systems contain predominantly acidic compounds, which are very corrosive on metal parts, thus rendering this method also inherently unsuitable for solving the posed problem.

OBJECTS OF THE INVENTION

It is an object of this invention to provide a novel process for increasing the molecular weight of elastomer polymers and copolymers and blends of polymers comprising them. It is another object to provide such a process which can be conducted in a simple manner employing apparatus conventional in the rubber-processing art. It is another object to provide a process which permits increasing the molecular weight of such polymers in a controlled manner. It is another object to provide a process which permits the use of compositions of relatively low viscosity comprising such polymers during a selected stage in processing and thereafter increasing their molecular weight to the desired final level. Other objects will be apparent to those skilled in the art to which this invention pertains.

SUMMARY OF THE INVENTION

According to this invention, the molecular weight of solid hydrocarbon elastomers, copolymers of polydienes and monoolefins, and blends thereof, can be increased in a defined, i.e., controlled, manner by a catalyzed thermal-mechanical treatment in the solid phase, in which the elastomer is subjected to strong shearing forces at temperatures of 80°–220° C., in the presence of 0.02–2 percent by weight of a catalyst system, calculated on the elastomer employed, comprising one or more metallic compounds as catalyst and an organic basic compound as cocatalyst.

DETAILED DESCRIPTION

The molecular weight of unsaturated, elastomeric, normally solid hydrocarbons, produced by the catalytic polymerization of diolefins, or copolymerization of monowith diolefins, or copolymerization of various diolefins with one another in inert organic solvents or in emulsion, having molecular weights of, e.g., 1,000 – 1,000,000, preferably 10,000 – 500,000, and particularly 50,000 – 250,000 can be increased in a manner whereby the objects of this invention can be achieved.

Hydrocarbon elastomers which can be employed include those produced from monomers having preferably 2 to 20, more preferably about 2 to 6 carbon atoms. Among the suitable unsaturated elastomeric hydrocarbons are, for example, polybutadiene, polyisoprene, as well as copolymers of, for example, butadiene or isoprene with mono-olefins containing preferably up to 20 carbon atoms, such as, for example, styrene. Still further polymers include butyl rubber (isobutylene/isoprene copolymer) as well as ethylene/propylene copolymers containing an unsaturated third component, such as biscyclopentadiene.

Preferred solid polydiene elastomers employed as starting materials in the process of this invention are polymers of conjugated dienes, such as, for example, polybutadienes and polyisoprenes, produced by all known manufacturing methods. Others are copolymers thereof with monoolefins, e.g., styrene, such as, for example, styrene-butadiene copolymers, produced by all known processes, e.g., emulsion polymerization, preferably in the presence of redox catalysts, and solution polymerization, preferably in the presence of organometallic catalysts. Especially preferred starting elastomers are butadiene homopolymers, e.g., dis-1,4-polybutadienes, preferably those having a high cis-butadiene content, e.g., 35 to 98 percent.

Also suitable as starting materials are amorphous elastomeric polyalkylene copolymers, e.g., copolymers with unsaturated termonomers, such as, for example, ethylene-propylene terpolymers, ethylene-butylene terpolymers. In addition to using the homo- and copolymers, blends thereof with one another can also be employed in any desired ratio.

The starting polymers for the process of this invention can be produced employing conventional catalyst systems. For example, polybutadienes can be produced by the polymerization of butadiene employing as the catalyst system:

a. titanium compounds/organometallic compounds, wherein preferably iodine-containing titanium compounds are used, or titanium tetrachloride or/and titanium tetrabromide are used in the presence of iodine-yielding compounds; or b. cobalt and/or nickel compounds/organometallic compounds.

Polyisoprenes can be produced with the mixed catalysts of titanium compounds/organometallic compounds; and the ethylene/propylene copolymers can be obtained with mixed catalysts of vanadium compounds/organometallic compounds. Still further, polybutadienes, polyisoprenes, as well as copolymers thereof, e.g., butadiene or isoprene with monoolefins, such as, for example, styrene, can be produced with alkali metals, such as lithium, sodium, and/or potassium in particular, and the organic compounds of these metals.

The reaction mixture can contain auxiliary rubber agents, e.g., in amounts varying from 0 to 250 percent, preferably 10 to 130 percent by weight, based on the elastomer present. Examples are fillers, such as, for example, carbon blacks, all "furnace" blacks, especially the high-abrasion furnace types ("HAF"), intermediate super abrasion furnace, ("ISAF"), and super abrasion furnace ("SAF"), e.g., in amounts of up to 150 percent or more, preferably 40 to 120 percent by weight, based on the elastomer. Other auxiliary agents which can additionally or alternatively be present are extender oils, preferably predominantly aromatic or naphthenic types, e.g., in amounts of up to 100 percent or more, preferably 10 to 100 percent, by weight, based on the elastomer. The presence of conventional extender oils does not interfere with the process of this invention. Stabilizers, antioxidants, zinc oxide, and stearic acid can also be present.

The reaction mixture also preferably contains water, e.g., about 1–5 percent by weight, preferably 1.5–3 percent by weight, based on the elastomer, the optimum amount depending on the cocatalyst employed.

The elastomer is subjected to strong shearing stresses in the process of this invention while at an elevated temperature, e.g., 80° to 220° C., preferably 120° to 190° C.

The process of this invention is conducted in the presence of 0.02 – 2 percent by weight, preferably 0.05 – 1 percent by weight, of a metallic-base catalyst-cocatalyst system, based on the elastomer employed.

The catalyst system employed in the process of this invention comprises metallic compounds as catalyst and a base as cocatalyst.

Metallic compounds which can be employed as catalysts include compounds of the formula:

wherein Me is B, Al, Ga, Be, Mg, Ca, Zn, Si, Sn, As, Sb, Ti, Zr, P, Mo, W, Bi, Fe, Hg, Cd, V, U, or VO; X is F, Cl, Br, or I; and $n$ is the valence of Me. Others include those of the above formula wherein X is a non-halogen anion, which with the Me ion provides an essentially neutral catalyst, e.g., inorganic anions, including sulfate, phosphate, nitrate, oxide, hydroxide, and organic anions, e.g., acetate, benzenesulfonate, p-toluenesulfonate, benzoate, citrate, etc.

Preferred metallic compounds which can be employed as the catalyst in the process of this invention are salts of aluminum, trivalent iron, tin, boron, zinc, and trivalent and tetravalent titanium. Preferred salts are the halides of the above-mentioned metals.

These metallic compounds are present during the thermal-mechanical treatment of this invention in amounts preferably of about 0.0005 to 0.5 percent by weight, preferably 0.001 to 0.1 percent by weight, based on the elastomer employed. In many cases, the traces of metallic compounds present in the elastomer, for example, remaining from the manufacturing process, are sufficient to act as the metallic catalyst for reaction. Therefore, an especially advantageous embodiment of the process of this invention for achieving the jump-like increase in the molecular weight of such solid elastomers employs elastomers having a metal content of 0.0005 to 0.1 percent, preferably 0.001 to 0.03 percent.

The cocatalysts employed in the process of this invention are bases, i.e., those which are reactive toward acids. Usually, organic bases are employed. In order to achieve a uniform molecular weight increase, the base cocatalyst should be intimately dispersed throughout the elastomer. Therefore, rubber-soluble bases, i.e., those which can be dissolved in the starting elastomer or the oil solution thereof employed in the process, are preferably employed. Such bases include primary, secondary, and tertiary amines, containing 1 to 30 carbon atoms, preferably 2 to 20 carbon atoms. Preferred are primary aromatic and aliphatic monoamines and diamines containing 6 to 30 carbon atoms, e.g. aniline, toluidine, xylidine, p-phenylenediamine, benzidine, and p,p'-diaminodiphenylmethane. Corresponding aliphatic amines, e.g., containing 1 to 20 carbon atoms, can be employed, e.g., alkylmono and alkyldiamines, e.g., n-hexylamine, laurylamine, stearylamine and hexamethylenediamine, and triamines, e.g., diethylene- and dipropylenetramine. Finally, polyamine compounds having higher molecular weights can likewise be utilized, e.g. polyethylene polyamide.

In the same manner, secondary amines, e.g., N-methylaniline and piperidine, tertiary amines, e.g., diethyl-aniline can also be employed.

Other bases which can be employed as cocatalysts are alkali-metal and alkaline earth metal alcoholates of aliphatic alcohols containing 1 – 10 carbon atoms, and alkaline hydrolyzing compounds, e.g., alkali-metal and alkaline earth metal salts of higher fatty acids, e.g., containing 12–20 carbon atoms.

Preferably the selected base has a boiling or decomposition point above the selected reaction temperature.

The cocatalyst contained in the catalyst system is employed in amounts of about 0.02 to 1.9 percent, preferably 0.05 to 1 percent, more preferably 0.04 to 0.9 percent by weight, calculated on the elastomer employed.

To attain an optimum result, the ratio of catalyst to cocatalyst can be varied. Thus, when employing an elastomer having significant metallic content, only trace amounts of catalyst need be added in some instances. In fact, in many cases, only the base, i.e., the cocatalyst, need be added because there is sufficient metallic compound already present in the starting elastomer to achieve the desired effect.

The amount of cocatalyst employed is usually substantially more than the amount of catalyst employed, except when the metallic compound has only a weakly catalytic effect, e.g., metallic oxide. Ratios, by weight, of cocatalyst to catalyst of about 1:1 to 100:1 or higher, preferably about 10 : 1 to 50:1, are usually employed.

In the process of this invention, the solid elastomer is subjected to strong shearing stresses. These shearing stresses can be produced in equipment conventionally employed in the processing of solid elastomers to incorporate fillers, extenders, stabilizers, pigments, etc., therein.

Processing machines which can be used to the desired shearing and mixing effect preferably include means for regulating the reaction temperature. Examples are internal mixers and rolling mills and extruder constructions of all types.

In accordance with another preferred embodiment of this invention, the elastomer is mixed, prior to or during or subsequent to the treatment with the catalyst system, with 10–100 percent by weight of a plasticizer oil, based on the elastomer. This mixing is preferably conducted at elevated temperatures, e.g., 80° to 220° C. Also, or alternatively, the elastomer is mixed with catalyst system 40 – 120 percent by weight, based on the elastomer, before or during treatment with the catalyst system.

A special advantage of the process of this invention is that the presence of additional mixture components, particularly fillers of all types, does not impair the successful conductance of the molecular weight raising step. Also, the fact that the molecular weight increase can be effected at any phase of the mixing and/or processing procedure is of particular importance.

The thus-obtained elastomer mixtures, because of their higher viscosity, can readily be further processed in accordance with conventional techniques and, after the final shaping has taken place, can be vulcanized into the finished component, e.g., in the manufacture of automobile tires and other molded vulcanized products.

The process of the present invention will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

300 g. portions of a cis-1,4-polybutadiene having a cis-1,4-proportion of about 97 percent, produced in the presence of a catalyst system containing cobalt salts and an organoaluminum compound, which polybutadiene contains 0,3 percent by weight of a nondiscoloring stabilizer and exhibits an ML–4 value of 47, an ash content of 1 percent and a moisture content of 0,75 percent, are mixed within a period of 5 minutes with varying different amounts of $FeCl_3$ and p-phenylenediamine as shown in Table 1, at temperatures of between 20° and 50° C., until the mixture is homogeneous. Thereafter, the mixture is subjected to high shearing forces in a rolling mill heated to 150° C. (450 × 200 mm., friction 1 : 1.2; gap width 0.7 mm) for 10 minutes. The Mooney viscosities of the resulting polymers are compiled in Table 1.

TABLE 1

| Percent by weight $FeCl_3 \cdot 6H_2O$: | | | | | |
|---|---|---|---|---|---|
| 0.1 | 38 | 32 | 55 | 89 | 88 |
| 0.05 | 24 | 35 | 75 | 85 | 79 |
| 0.01 | 30 | 53 | 83 | 71 | 68 |
| Percent by weight p-phenylenediamine | 0 | 0.05 | 0.1 | 0.2 | 0.5 |

EXAMPLE 2

In accordance with Example 1, a mixture of $AlCl_3$ and in a 1 : 1 ratio $H_2O$ is employed as the catalyst in place of $FeCl_3 \cdot 6 H_2O$ under otherwise identical conditions. The Mooney viscosities of the resulting polymers are set forth in Table 2.

TABLE 2

| Percent by weight $AlCl_3/H_2O = 1:1$: | | | | |
|---|---|---|---|---|
| 0.5 | 45 | 46 | 49 | 67 |
| 0.2 | 45 | 53 | 69 | 79 |
| 0.1 | 46 | 62 | 77 | 83 |
| 0.02 | 47 | 57 | 63 | 92 |
| Percent by weight p-phenylenediamine | 0.02 | 0.05 | 0.1 | 0.2 |

EXAMPLE 3

In the same manner as described in Example 2, but using p,p'-diaminodiphenylmethane as the cocatalyst, a mixture of 100 parts of the starting cis-1,4-polybutadiene employed in Examples 1 and 2 in 37.5 parts of an extender oil having a high aromatics content is subjected to the same thermal-mechanical stress. The ML–4 value of the polybutadiene-oil mixture is 22. The Mooney viscosities of the thus-obtained polymers are compiled in Table 3.

TABLE 3

| Percent by weight $AlCl_3/H_2O = 1:1$: | | | | |
|---|---|---|---|---|
| 1.0 | 22 | 23 | 23 | 23 |
| 0.2 | 28 | 44 | 29 | 20 |
| 0.1 | 20 | 46 | 29 | 23 |
| 0.02 | 23 | 20 | 23 | 23 |
| Percent by weight p,p'-diaminodiphenylmethane | 0.1 | 0.2 | 0.3 | 0.5 |

EXAMPLE 4

To demonstrate the effect of treatment time on the results obtained in the process of this invention, a polybutadiene having a high cis-content produced with a titanium-containing catalyst, is mixed with 0.01 percent by weight of $FeCl_3 \cdot 6 H_2O$ and 0.1 percent of p,p'-diaminodiphenylmethane, and thereafter treated in a rolling mill analogously to the procedure described in Example 1 except for different periods of time. The Mooney values subsequently obtained are shown in Table 4.

TABLE 4

| Reaction Time at 150° C., Minutes | ML-4 Value after Termination of Reaction |
|---|---|
| 0.5 | 60 |
| 1 | 70 |
| 2 | 73 |
| 3 | 85 |
| 5 | 96 |
| 8 | 80 |

EXAMPLE 5

Portions of a polybutadiene having a high cis-content, produced with the aid of a cobalt catalyst, having an Fe-content of about 0.001 percent and an Al-content of about 0.002 percent, is mixed with varying amounts of p,p'-diaminodiphenylmethane and then treated in a rolling mill as described in Example 1 for periods of time varying from 4 to 16 minutes. The ML-4 values of the resulting products are shown in Table 5.

TABLE 5

| % By Weight p,p'-Diaminodiphenylmethane | ML-4 After Rolling Treatment at 150°C. | | |
|---|---|---|---|
| | 4 Min. | 8 Min. | 16 Min. |
| | 44 | 43 | 38 |
| 0.05 | 48 | 60 | 98 |
| 0.1 | 47 | 49 | 111 |
| 0.2 | 45 | 47 | 85 |
| 0.3 | 45 | 47 | 73 |
| 2.0 | 45 | 43 | 48 |

All samples having ML-4 values of below 100 do not exhibit any appreciable gel proportions. By simultaneously adding to the reaction mixture 0.5 percent by weight of a complex-forming agent, e.g., tartaric acid, no increase occurs in the Mooney viscosity.

EXAMPLE 6

As described in Example 5, a type 1,500 butadiene-styrene copolymer having an Fe-content of about 0.025 percent by weight is subjected to the rolling mill treatment in the presence of p,p'-diaminodiphenylmethane as the basic cocatalyst. The results are shown in Table 6.

TABLE 6

| % By Weight p,p'-Diaminodiphenylmethane | ML-4 After Rolling Mill Treatment at 150° C. | | |
|---|---|---|---|
| | 4 Min. | 8 Min. | 16 Min. |
| | 47 | 47 | 50 |
| 0.2 | 52 | 81 | 108 |
| 0.5 | 46 | 66 | 115 |
| 1.0 | 44 | 48 | 84 |

All products obtained after 8 minutes of treatment time are partically gel-free. The above-described reaction does not occur in the presence of metal deactivators.

EXAMPLE 7

In order to produce an oil-extended cis-1,4-polybutadiene 1,900 g. of a polybutadiene having a high cis-content, produced by a cobalt catalyzed polymerization and having a Mooney viscosity of 48, a Fe-content of 0.001 percent by weight, and an Al-content of 0.002 percent by weight, is introduced, together with 3.8 g. of p,p'-diaminodiphenylmethane into an internal mixer of the type GK 2. (Banbury)

At a jacket temperature of 160° C., and a front rotor speed of 60 r.p.m., the mixture is treated for 4 minutes. Thereafter 712 g. of a mineral oil plasticizer having a high aromatics content is added thereto. After another 2 minutes, the homogeneous rubber-oil batch is discharged. Its Mooney viscosity is 39 and the gel content thereof is around 3 percent by weight.

Based on the following recipe, a vulcanized product is made therefrom:

| | Parts by Weight |
|---|---|
| Oil rubber | 137.5 |
| Aromatic plasticizer oil | 2.5 |
| HAF-Carbon black | 75 |
| ZnO | 5 |
| Stearic acid | 2 |
| Phenyl-$\beta$-naphthylamine | 1 |
| Sulfur | 2.2 |
| N-Cyclohexyl-2-benzothiazolesulfenamide | 1.1 |

The properties of the thus-obtained vulcanized product are set forth in Table 7.

TABLE 7.1

| Heating time at 143° C., min. | Tensile strength, kg./cm.² | Elongation, percent | Modulus 300% kg./cm.² | Permanent elongation, percent | Hardness, ° Shore | Rebound elasticity | | DIN abrasion, mm.³ |
|---|---|---|---|---|---|---|---|---|
| | | | | | | 22° C. | 75° C. | |
| 15 | 146 | 418 | 92 | 9 | 60 | 46 | 55 | |
| 30 | 131 | 354 | 106 | 7 | 60 | 46 | 56 | 50 |
| 60 | 132 | 364 | 100 | 6 | 60 | 46 | 53 | 51 |
| 120 | 128 | 390 | 86 | 8 | 59 | 44 | 50 | |

For comparison therewith, the properties of a cis-1,4-polybutadiene produced with the same catalyst system are compiled in Table 7.2 below. Subsequently to the polymerization, this polybutadiene was subjected to the conventional molecular weight jump reaction in solution and was then worked up, after the addition of 37.5 parts by weight of extender oil having a high aromatics content, to produce a solid rubber having an ML-4 value of 41, and vulcanized as set forth above.

TABLE 7.2

| Heating time at 143° C., min. | Tensile strength, kg./cm.² | Elongation, percent | Modulus 300% kg./cm.² | Permanent elongation, percent | Hardness, ° Shore | Rebound elasticity | | DIN abrasion mm.³ |
|---|---|---|---|---|---|---|---|---|
| | | | | | | 22° C. | 75° C. | |
| 15 | 145 | 428 | 93 | 8 | 60 | 46 | 55 | |
| 30 | 125 | 344 | 103 | 7 | 61 | 48 | 57 | 51 |
| 60 | 125 | 336 | 99 | 8 | 61 | 48 | 55 | 51 |
| 120 | 115 | 352 | 90 | 8 | 60 | 46 | 50 | |

EXAMPLE 8

The Mooney viscosity of the following mixture is determined after treatment times of from 4 to 20 minutes in a GK 2 Mixer, at a jacket temperature of 50° C. and a speed of rotation of the front rotor of 60 r.p.m.

| | Parts by Weight |
|---|---|
| cis-1,4-Polybutadiene | 100 |
| Aromatic plasticizer oil | 40 |
| HAF-Carbon black | 75 |
| ZnO | 5 |
| Stearic acid | 2 |
| Phenyl-β-naphthylamine | 1 |

In a second experiment, 0.2% by weight of benzidine is additionally incorporated into the mixture. The results of both experiments are compiled in Table 8.

TABLE 8

| Treatment Time Minutes | ML-4 Mixture Without Benzidine | ML-4 Mixture + 0.2% By Weight of Benzidine |
|---|---|---|
| 4 | 49 | 59 |
| 6 | 43 | 54 |
| 10 | 40 | 50 |
| 15 | 37 | 48 |
| 20 | 34 | 47 |

EXAMPLE 9

Analogously to Example 8, the behavior of a blend of cis-1,4-polybutadiene and a type 1,500 styrene-butadiene copolymer ratio of 40 : 60, with the same additives, is subjected to the same thermal-mechanical treatment, except that the benzidine is incorporated into the mixture. The results are compiled in Table 9.

TABLE 9

| Treatment Time / Minutes | ML-4 of the Mixture |
|---|---|
| 4 | 49 |
| 6 | 45 |
| 10 | 42 |

At this point, 0.2% by weight of benzidine is added.

| | |
|---|---|
| 11 | 51 |
| 12 | 49 |
| 15 | 47 |
| 20 | 46 |

This example illustrates the possibility of obtaining a jump-like increase in the Mooney viscosity at any desired point of the processing procedure.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the defined increase of the Mooney viscosity of solid hydrocarbon elastomers by a catalyzed thermal-mechanical treatment, which comprises subjecting the elastomer in the solid phase to strong shearing stresses at a temperature of 80°–220° C. in the presence of at least one of a plasticizer oil and a filler and also 0.02 – 2 percent by weight, calculated on the elastomer employed, of a catalyst-cocatalyst system comprising as the catalyst about 0.0005 to 5 percent by weight, calculated on the elastomer, at least one essentially neutral metallic compound of the formula $MeX_n$ wherein Me is B, Al, Ga, Be, Mg, Ca, Zn, Si, Sn, As, Sb, Ti, Zr, P, Mo, W, Bi, Fe, Hg, Cd, V, U or VO, n is the valence of Me and X is F, Cl, Br, I or a non-halogen anion which with the Me ion provides an essentially neutral catalyst and as the cocatalyst about 0.2 to 1.9 percent by weight, calculated on the elastomer of a primary, secondary or tertiary amine containing 1 to 30 carbon atoms, an alkaline earth metal alcoholate of an aliphatic alcohol containing 1–10 carbon atoms, or an alkali-metal salt or alkaline earth metal salt of a fatty acid containing 12–20 carbon atoms.

2. A process according to claim 1 wherein the reaction mixture contains a filler.

3. A process according to claim 2 wherein the filler is carbon black.

4. A process according to claim 3 wherein the reaction mixture contains 40 to 120 percent of carbon black, based on the elastomer.

5. A process according to claim 1 wherein the reaction mixture contains an extender oil.

6. A process according to claim 5 wherein the reaction mixture contains 10 to 100 percent by weight of a predominantly aromatic or naphthenic type extender oil, based on the elastomer.

7. A process according to claim 1 wherein the reaction mixture contains both an extender oil and a filler.

8. A process according to claim 1 wherein the elastomer is a polydiene.

9. A process according to claim 8 wherein the polydiene is a member of the group consisting of polybutadienes, polyisoprenes, and copolymers of butadiene and styrene.

10. A process according to claim 1 wherein the reaction temperature is 120° to 190° C.

11. A process according to claim 1 wherein the reaction mixture contains 1 to 5 percent by weight of water, based on the elastomer.

12. A process according to claim 11 wherein the reaction mixture contains 1.5 to 3 percent by weight of water, based on the elastomer.

13. A process according to claim 1 wherein the reaction mixture contains about 0.001 to 0.1 percent by weight of the metallic compound catalyst, based on the elastomer.

14. A process according to claim 1 wherein the reaction mixture contains as the catalyst a salt of aluminum, trivalent iron, tin, boron, zinc, or of trivalent or tetravalent titanium.

15. A process according to claim 14 wherein the salt is a halide salt.

16. A process according to claim 15 wherein the reaction mixture contains $FeCl_3$ or $AlCl_3$ as catalyst.

17. A process according to claim 1 wherein the reaction mixture contains about 0.04 to 0.9 percent by weight of the base as cocatalyst, based on the elastomer.

18. A process according to claim 1, wherein the base co-catalyst is a member of the group consisting of alkali-metal and alkaline earth alcoholates, and primary, secondary, and tertiary amines.

19. A process according to claim 18 wherein the cocatalyst base is an amine.

20. A process according to claim 19 wherein the amine is a primary aromatic amine or diamine containing 6 to 30 carbon atoms.

21. A process according to claim 20 wherein the amine is p-phenylenediamine, benzidine or p,p'-diaminodiphenylmethane.

22. A process according to claim 1 wherein the starting elastomer has a molecular weight of between 10,000 and 50,000 and is a member of the group consisting of polybutadienes, polyisoprenes and copolymers of butadiene and styrene; the reaction is conducted for up to about 20 minutes at a temperature of 120° to 190°C; the reaction mixture contains a metallic compound catalyst selected from the group consisting of a salt of aluminum, trivalent iron, tin, boron, zinc, or trivalent or tetravalent titanium and an amine as the cocatalyst.

23. A process according to claim 22 wherein the reaction mixture contains about 0.001 to 0.1 percent by weight of a halide salt as the catalyst and 0.04 to 0.9 percent by weight of a primary aromatic amine or diamine containing 6 to 30 carbon atoms as the cocatalyst, based on the elastomer.

24. A process according to claim 1 wherein the molecular weights of the solid hydrocarbon elastomers are between 10,000 and 500,000.

25. A process according to claim 1 wherein the molecular weights of the solid hydrocarbon elastomers are between 50,000 and 250,000.

26. A process according to claim 22 wherein the cocatalyst is p-phenylenediamine, benzidine or p,p'-diaminodiphenylmethane.

27. A process according to claim 23 wherein the cocatalyst is p-phenylenediamine, benzidine or p,p'-diaminodiphenylmethane.

* * * * *

UNITED STATES PATENT OFFICE
CERTIFICATE OF CORRECTION

Patent No. 3,803,080          Dated   April 9, 1974

Inventor(s)  Karl-Heinz Nordsiek

It is certified that error appears in the above-identified patent and that said Letters Patent are hereby corrected as shown below:

IN THE HEADING, UNDER "FOREIGN APPLICATION PRIORITY DATA":

Insert -- Germany, May 23, 1969, P 19 26 322.0 --.

Signed and sealed this 13th day of August 1974.

(SEAL)
Attest:

McCOY M. GIBSON, JR.             C. MARSHALL DANN
Attesting Officer                Commissioner of Patents